March 31, 1931.  C. R. WESTMORELAND  1,798,241
POSITIVE DRIVE AXLE FOR VEHICLES
Filed Feb. 27, 1930
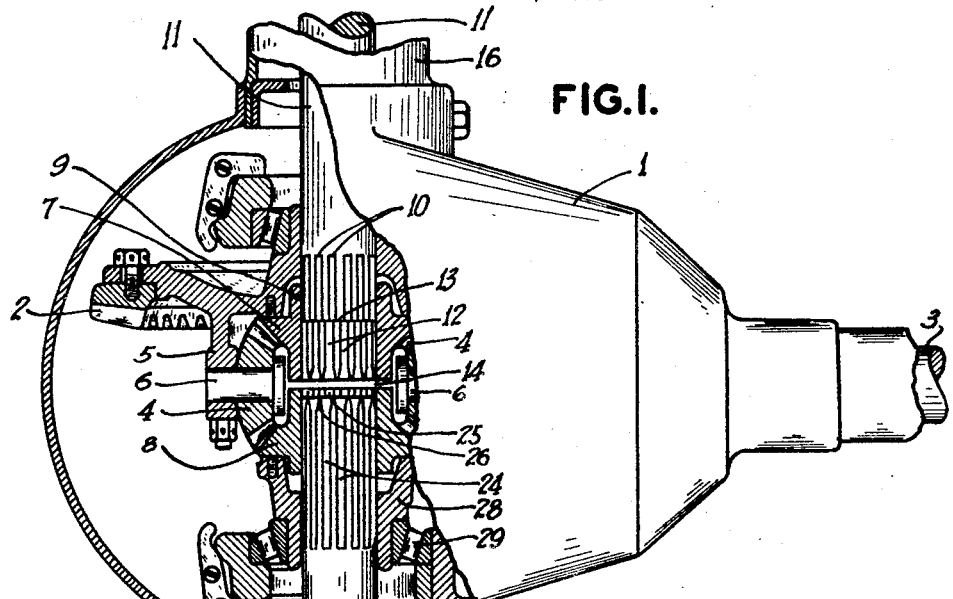
INVENTOR
Charles R. Westmoreland
BY
Loyal J. Miller,
ATTORNEY Patented Mar. 31, 1931

1,798,241

UNITED STATES PATENT OFFICE

CHARLES R. WESTMORELAND, OF OKLAHOMA CITY, OKLAHOMA

POSITIVE-DRIVE AXLE FOR VEHICLES

Application filed February 27, 1930. Serial No. 431,994.

My invention relates to vehicles and their driving axles or shafts.

The objects of my invention are to provide a device of this class which is new, novel, practical and of utility; which will selectively give equal traction to both rear wheels of an automobile; which will increase the traction of a vehicle one hundred per cent when pulling in mud, mire or other soft or slick material; which may be used when desired or disengaged at the driver's convenience; which will be controlled from the driver's seat in the vehicle; which may be installed upon other power driven vehicles than automobiles; which will be positive in action; which will be strong and durable; and which will be efficient in accomplishing all the purposes for which it is intended.

In order to permit one rear wheel to idle in turning corners, the rear axle of the automobile of present use is provided with differential gearing. This gearing is such that the two rear wheels are driven by the engine only when they are both traveling upon a solid surface. It frequently occurs that automobiles become stalled in mud, due to the fact that the surface under one wheel provides better traction than the surface under the other. When this occurs the wheel with the least surface traction will revolve without moving the car, while the other wheel remains stationary.

My device will give equal power to both wheels, when desired.

With these and other objects in view as will more fully appear, my invention consists in the construction, novel features, and combination of parts hereinafter more fully described, pointed out in the claims hereto appended, and illustrated in the accompanying one-sheet drawing, of which, Figure 1 is a longitudinal sectional view of an automobile differential gearing and its housing showing my device connected therewith;

Fig. 2 is a broken sectional view along the line 2—2 of Fig. 1; and

Fig. 3 is a sectional view along the line 3—3 of Fig. 2.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

One pratical embodiment of the invention as illustrated in the drawings includes:

A usual vehicle differential housing 1, housing a usual ring gear 2, driven in a usual manner by a drive shaft 3. As is usual with differentials, ring gear 2 carries floating beveled gears 4 suspended on arms or brackets 5 and rotatable on pins 6. Gears 4 co-operate with beveled gears 7 and 8 in driving the vehicle axle which is usually in two pieces. The structure thus far described is usual with the exception that gear 7 has its hub 9 slightly elongated. This is done in order to permit the longitudinal teeth 10 on shaft 11 to be driven by the interior teeth 12 inside the bore of said gear 7 and at the same time permit a portion of the longitudinal extent of teeth 12 to remain unused by the shaft 11. The inner end of shaft 11 is indicated at 13 and the space between the gears 7 and 8 is shown at 14. The bore of gear 8 has interior teeth 25 similar to teeth 12 in gear 7, and the bores of the gears 7 and 8 are in axial alinement. The usual hollow axle or housing for shaft 11 is shown at 16 and is attached to the housing 1.

In axial alinement with said housing 16 and extending outward from the opposite side of housing 1, I provide a hollow housing 17 which is also connected at its inner end to the differential housing 1. Said housing 17 has an enlarged portion 18 which has a removable cap 19 more fully described later. Said housing 17 is also provided with a second slightly enlarged portion 20 adjacent its outer end, which forms an interior shoulder 21. An annular projection 22 is formed upon the inside wall of said housing 17, the office of which is more fully described herebelow.

Extending longitudinally within said housing 17 is provided a second shaft 23, its inner end portion having longitudinal teeth 24 meshing with the smiliar interior teeth 25 within the bore of said gear 8. The inner end of shaft 23 is indicated at 26 while its outer end is shown at 27. The cylindrical sleeve 28 carried by gear 8, and the bearing 29 carried by the housing 1, are usual to differentials. Around the outer end portion of said shaft 23 and adjacent its end 27 is provided a sleeve 30 which is rigidly attached to said shaft 23 by a key 31. That portion of said shaft 23 which is engaged by said sleeve 30 is slightly enlarged as shown at 32 to prevent sleeve 30 from slipping over end 27. Said sleeve 30 extends outwardly past the end 27 of shaft 23, and is provided with interior teeth, not shown, similar to the interior teeth 10 and 25 in respective gears 7 and 8. The outwardly extending, interiorly toothed portion of said sleeve 30, receives the inner end portion of a third shaft 33 having longitudinal teeth 34 upon its inner end portion. Shaft 33 is provided with a bearing 35 which bears against said shoulder 21. Shaft 23 is provided with a bearing 36 which is held against the annular lug 22 by the force exerted on a bearing ring 37 by one end of compression spring 38 around said shaft 23. The other end of said spring 38 bears against the inner end of said sleeve 30 and assists in holding said key 31 in place.

By the description of the structure thus far, it may be seen that said shafts 11 and 23 are driven by the respective gears 7 and 8, and that said shaft 23 may be moved in a longitudinal direction through said gear 8 a sufficient distance to cause the teeth 24 to mesh with the interior teeth 12 in said gear 7, in which event gears 7 and 8 are both locked together and act as a positive drive for said shaft 23, and cease to operate independently. It will further be seen that sleeve 30 will prevent the disengagement of shaft 23 and shaft 33 when said shaft 23 is moved to within said gear 7. It will also be understood that the action of said spring 38 will normally hold said shaft 23 at the outward end of its throw, and that force sufficient to overcome the tension of spring 38 must be exerted before said shaft 23 may be slid to the inner end of its throw.

As a means of selectively exerting this force, I provide as follows:

Within said enlarged portion 18 of housing 17, and around said shaft 23, I provide a sleeve 39 held rigidly upon said shaft 23 by a key 40. Said sleeve has a flat bottomed straight sided groove 41 girdling its midportion. A split clutch band 32 is held within said groove 41 by bolts or the like 43 the nuts of which may be provided with cotter pins 44 if desired. Said band 42 is provided with two oppositely disposed perpendicular pins 45. A yoke is provided for engaging said pins 45. Said yoke comprises an upper member 46 and a lower member 47 held together by bolts or the like 48. Each of said members 47 and 48 have a bore for receiving one of the pins 45. Said upper member 46 has an outward extending arm 49, the outer end of which is pivotally connected to one end of a short arm 54 of a bell crank 50 by a pivot pin 51, said arm 54 being rigid with a perpendicular pin 52. Crank 50 is pivotally mounted upon the housing cover 19 by said pin 52. It may be seen that any lateral movement of the arm 53 of crank 50 which lies outside of cover 19 and which is keyed to said pin 52 will through the action of the arm 49 and yoke members 46 and 47, impart a movement to pins 45 and band 42, which in turn will act on sleeve 39 to move shaft 23 longitudinally.

Assembly

In assembling the device, shaft 23 will be inserted in sleeve 30 as far as its beveled portion 32 will permit. Key 31 will then be inserted. Spring 38 will next be placed over shaft 23 until it contacts the inner end of sleeve 30 and key 31. Ring 37 and bearing 36 will then be placed over shaft 23, and sleeve 39 will be keyed to shaft 23. The parts thus far assembled will next be inserted through the outer end of housing 17 until the teeth 24 on shaft 23 are inserted within the toothed bore of said gear 8. Shaft 33 will next be inserted within the outward extending portion of said sleeve 30 and bearing 35 will be positioned around said shaft 33 and against said shoulder 21. The means of holding said bearing 35 in this position is not shown herein as any usual means may be resorted to such as a threaded ring or the like. The structure lying beyond the outer ends of the structure shown in Fig. 1 may be usual to any motor driven vehicle. Suffice to say that the outer ends, not shown, of shafts 11 and 33 will carry the rear wheels of the vehicle. Of course in case the vehicle is driven by the front wheels, my invention would be applicable equally as well.

After the above described assembly has been accomplished, the band 42 will be positioned within groove 41 by the bolts 43. This will be accomplished through the open top of enlarged portion 18 of housing 17. Yoke members 46 and 47 will next be placed over pins 45 and fastened together by bolts 48. Arm 54 of crank 50 will then be connected by pin 51 to the arm 49 of yoke member 46. This will bring said pin 52 in position for receiving cover 19 which is then put in place. Arm 53 of crank 50 is then placed and keyed to the upper end portion of said pin 52, and a nut 55 is tightened down. Studs 56 are provided for holding cover 19 hermetically in place.

Any desired means may be connected to the free end, not shown, of arm 53 for actuating said arm from the driver's seat of the vehicle.

It may now be seen that any movement of arm 53 toward and transverse to the axis of said housing 17, will slide shaft 23 longitudinally through said gear 8 and will slide the toothed portion of shaft 23 into said gear 7, locking the two gears axially together and causing the ring gear to act positively in driving both shaft 11 and shaft 23. The sleeve 30 will drive the shaft 33 regardless of the longitudinal position of shaft 23. When arm 53 is released, spring 38 will withdraw shaft 23 from gear 7 and gears 7 and 8 will then be free to act independently in a usual manner.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is;

1. The combination with a vehicle differential having a first usual wheel drive shaft, a second shaft oppositely extending from said differential in axial alinement with said first shaft, the inner end portion of said second shaft having longitudinal teeth thereon, said second shaft adapted for sliding longitudinally through one interiorly toothed differential gear into another and when in this position to be driven simultaneously by both gears, an interiorly toothed sleeve rigidly positioned on the outer end of said second shaft, a third shaft in axial alinement with said second shaft having longitudinal teeth on its inner end, said teeth engaging the interior teeth within said sleeve, said first shaft and said third shaft carrying the vehicle wheels on their respective outer ends, and means for selectively imparting longitudinal movements to said second shaft for its engagement and disengagement with said differential gears, of a compression spring and a bearing ring, around said second shaft said ring held against longitudinal movement by means foreign to said shaft, said spring bearing against said ring and against the inner end of said sleeve for holding said shaft at the outer end of its throw.

2. The combination with a vehicle differential and a first usual wheel drive shaft carrying one wheel of the vehicle on its outer end, said shaft having longitudinal teeth on its inner end driven by an interiorly toothed first differential gear, of a device as described having in combination, a second shaft oppositely extending from said differential in axial alinement with said first shaft, the inner end portion of said second shaft having longitudinal teeth thereon driven by and adapted for sliding longitudinally through a second interiorly toothed differential gear and into said first differential gear, and when in this position to be driven simultaneously by both gears, an interiorly toothed sleeve rigidly positioned on and extending outwardly past the outer end of said second shaft, a third shaft in axial alinement with said second shaft, said third shaft having longitudinal teeth on its inner end slidably engaged withing said sleeve, said third shaft carrying one wheel of the vehicle on its outer end, means carried by said second shaft for normally holding it at the outer end of its throw, and means for selectively imparting longitudinal movement to said second shaft for causing it to engage or disengage said first differential gear.

3. Organization as described in claim 2, in which said shaft holding means comprises, a compression spring and a bearing ring around said second shaft, said ring held against longitudinal movement by means foreign to said shaft, said spring bearing against said ring and against the inner end of said sleeve for holding said shaft at the outer end of its throw.

4. Organization as described in claim 2, in which the means for imparting longitudinal movement to said second shaft includes a collar keyed to the shaft, a band disposed in a groove around said collar, and an arrangement of cranks connecting said band for manually operating and for imparting movement to said band in longitudinal relation with said shaft.

CHARLES R. WESTMORELAND.